May 26, 1970 E. P. HANSON 3,513,968

CONTROL SYSTEM FOR TYPESETTING ARABIC

Filed Jan. 24, 1967 3 Sheets-Sheet 1

INVENTOR
ELLIS P. HANSON
BY
Weingarten, Orenbuch & Lahive
ATTORNEYS

INVENTOR
ELLIS P. HANSON
BY
Weingarten Orenbuch & Hahn
ATTORNEYS

INVENTOR
ELLIS P. HANSON
BY Weingarten, Orenbuch & Lahive
ATTORNEYS

United States Patent Office 3,513,968

Patented May 26, 1970

3,513,968

CONTROL SYSTEM FOR TYPESETTING ARABIC

Ellis P. Hanson, Rockport, Mass., assignor to Compugraphic Corporation, Reading, Mass., a corporation of Massachusetts Filed Jan. 24, 1967, Ser. No. 611,319
Int. Cl. B41b 9/06
U.S. Cl. 199—18 3 Claims

ABSTRACT OF THE DISCLOSURE

A reader unit translates codes representing successive Arabic characters and space units into signals which are temporarily stored in a first shift register and successively decoded to classify the data, by a two-bit output signal, into one of three classes of data and sent to a second shift register which stores three successive sets of class data. A second decoder determines the form of the character from the character classification immediately preceding and following the given character. Simultaneously therewith, the data from the first shift register is decoded by a third decoder to indicate the particular character itself. The latter information plus the character form are used to address a memory to select the character in its desired form and signal typesetting control and justification apparatus prior to printing the character. The apparatus includes a Kashida code generator and ligature generating circuitry.

FIELD OF THE INVENTION

This invention relates in general to typesetting and more particularly to a control system for producing operating signals for a linecasting or other typesetting machine in response to keyboarded information.

DESCRIPTION OF THE PRIOR ART

In the field of typesetting in general and particularly in linecasting, process control systems have been developed to generate typesetting control signals from keyboarded information. Such systems have, for the most part, been concerned with producing signals in response to keyboarded information which result in the linecasting or other typesetting machines producing justified composition of a particular type face. Such a system is described in U.S. Letters Patent No. 3,307,154 by W. W. Garth, Jr. and Ellis P. Hanson. Such systems are designed for and operate generally with the Roman alphabet. The typesetting problems of many non-Roman scripts are somewhat more complex. This is particularly true of cursive scripts in which the same letter has different forms depending upon its position within the composition. Arabic is such a script. Thus in Arabic there are twenty-eight letters in the alphabet in addition to numerals, diacritical marks, points and signs. Six of these twenty-eight letters have two character forms designated a final form and an unconnected or isolated form. Each of the remaining twenty-two letters has four distinct forms, final, unconnected, initial and medial. Which form any individual letter has will depend upon its position within the composition. The vowel sounds in Arabic are represented by diacritical marks which are used to modify these characters. While these marks are not used in normal day-to-day printing, they are used for both children's texts and for technical work where high precision is required. Thus a keyboard for typesetting Arabic which includes the letter forms, the diacritical marks and numerals must have over one-hundred characters. As a result the keboarding of Arabic scripts is a very slow and inefficient process.

In many languages, both cursive and non-cursive, similar problems arise, although to a lesser degree, from the use of ligatures. A ligature is a combined character form representing a particular combination of individual letters. The problem is particularly severe in the Indian languages which contain many ligatures and is also present in English. In English, ligatures are often substituted for combinations of the letters f, l, and i.

One approach to the problem of Arabic typesetting has been to modify the basic language to produce a simplified Arabic script. In this script each character has only two forms, thus reducing while not eliminating the problem of the appropriate form for each letter. Such a solution is not entirely satisfactory, however, since it is in essence a degradation of the language form rather than an arrangement in which typesetting of the script is made faster and more efficient.

SUMMARY OF THE INVENTION

Broadly speaking, the typesetting control system of this invention provides control signals to a typesetting machine to set each character in its proper form from a composition which has been keyboarded using only the basic letter information. Thus the keyboard is established with only one form for each letter and, irrespective of the position in the composition, this form of the letter is keyboarded. In general the control system of the invention would receive as an input a perforated tape with a series of codes representing successive characters and space units. This tape is applied to a reader unit which translates the codes into electrical codes representing each character and space unit. These codes are then decoded and applied as addressing signals to a memory unit, which has stored within it signals representing each of the characters in each of its possible forms. The output signals from the reader are also applied to a logical system which has been programmed to determined the appropriate form for a character. As will be discussed in more detail below the logic determining the choice of character form depends upon the class of character preceding and the class of character following each individual character. The Arabic script may be considered as forming three class groups. One group includes only those characters, such as numerals, spaces, points and signs, which have only one form. A second class includes those letters which have but two forms, while the third class includes characters which may appear in all four forms. The output from this second logical decoder is also applied to the memory unit which is arranged to produce, in response to these two addressing signals, an output code corresponding only to the proper form of the keyboarded character. This typesetting control system would normally be operated to include a justification unit for sending justification control signals to the typesetting machine so that the final composition contains each of the characters in its appropriate form and is also justified to a predetermined column width.

DESCRIPTION OF THE PREFERRED EMBODIMENT

Figure 1:
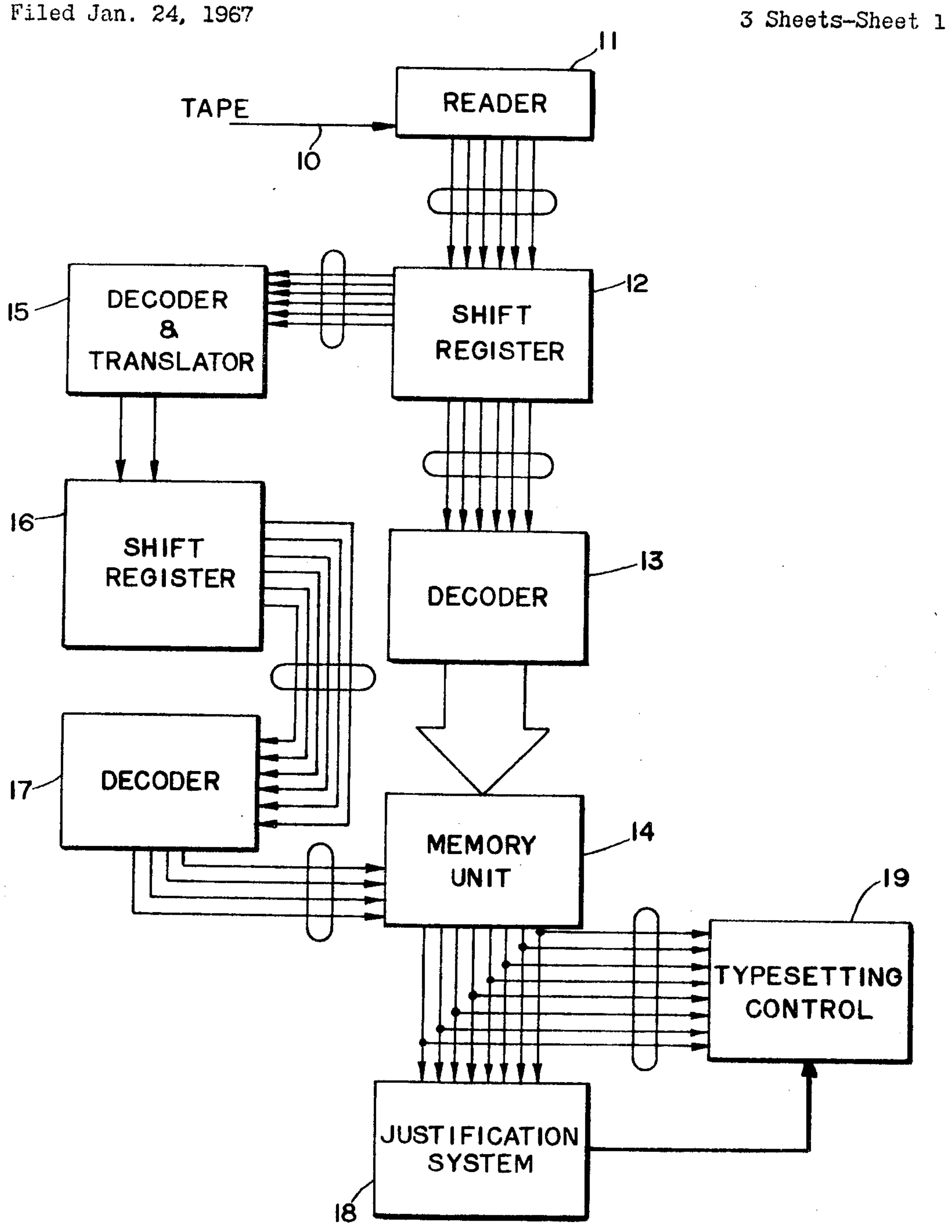
FIG. 1 is an illustration in block diagrammatic form of one embodiment of a typesetting control system in accordance with the principles of this invention.

Referring now to FIG. 1, there is illustrated one embodiment of a typesetting control system constructed in accordance with the principles of this invention. The tape 10 which contains information keyboarded in terms of the spaces and characters, is applied as an input to a reader 11. The reader 11 translates the coded information on the input tape 10 into a six-bit electrical output signal. The electrical output of the reader 11 is connected to the input of a two-position shift register 12, the output of which is in turn connected to a decoder 13. The shift register 12 is a conventional shift register arranged to contain six bits in parallel and to store each code in an initial position before shifting it into the output position. The shift register 12 has output leads from its initial position for providing to decoder and translator unit 15 a signal representing the code stored at any given time in the initial position in the shift register 12. The decoder and translator unit 15 sends a two-bit output signal to the class shift register 16. The class shift register 16 has three successive storage positions, each capable of storing a two-bit code. A pair of leads from each of the storage positions in shift register 16 are connected to a decoder unit 17 and this latter unit is coupled through four individual leads to a memory unit 14. The two-position shift register 12 also provides the stored six-bit output code from its output storage position and this code is connected to a decoder unit 13 having sixty-four individual output leads coupled to the memory unit 14. The output from the memory unit 14 is an eight-bit code which is applied to a typesetting control unit 19, for generating control signals for a linecasting or other typesetting machine, and which is also connected to a justification unit 18. The justification unit 18 may be any suitable system for responding to typesetting composition material and providing justification control signals to a typesetting machine in accordance with a predetermined justification system. A suitable system is described, for example, in U.S. Pat. No. 3,307,154.

The operation of the system described above is as follows: the keyboard operator keyboards the composition to be typeset without regard to the form of the characters. Each character has only one representation on the keyboard so that, in Arabic, the keyboard would carry only twenty-eight letter characters in addition to the numerals, accents, punctuation and space units. This information is coded onto a punched tape 10 which serves as the information input to the reader unit 11. The six-bit electrical output from the reader 11 then represents this keyboarded information in terms of a succession of six-bit electrical codes applied to the input of the shift register 12. When the electrical code for a given character is in the first storage position of the shift register 12 the code is also presented to the decoder and translator unit 15. The decoder and translator unit 15 is a combination of a tree circuit and signal generator, with the tree circuit sorting the six-bit input code into one of three classes and, dependent on the class of the input code, the signal generator provides an identifying two-bit electrical code.

The basis of classification of the input code is as follows: class 1 includes those characters of the Arabic alphabet which have only an isolated or unconnected form. This class includes, for example, all space units, numerals, and punctuation. Class 2 includes those characters that have only a final and an unconnected form. Class 3 includes all of the letters that exist in all four forms, that is, initial, medial, final and unconnected. This two-bit output code identifying the class of the character coded into the first storage position of shift register 12, is applied to the input of the class shift register 16. This latter shift register has three storage positions, each providing a pair of output leads to decoder 17. When the next successive code on tape 10 is translated by the reader 11 the code existing in the first storage position of shift register 12 is shifted into the second storage position and the new code is entered into the first storage position of the register 12. Simultaneously the class identifying code stored in the first storage position of the class shift register 16 is shifted into the second position allowing the class identifying code for the new entry into the first storage position of shift register 12 to be entered into the first storage position of shift register 16.

The code in the second storage position of shift register 12 is transmitted to the decoder unit 13 which is also a tree circuit. The decoder 13 will, depending upon the particular code at its input, actuate a corresponding one of its sixty-four output leads. The lead actuated is then indicative of the code existing in the second storage position of the shift register 16. Each of the individual output leads from the decoder 13 is connected to at least one address point in the memory unit 14. Accordingly the particular code existing in the second storage position of shift register 12 determines the address point or points in memory unit 14 which are actuated. In the class shift register 16 the code in the first storage position indicates the class of the character coded into the first storage position in shift register 12, while the code stored in the second storage position of shift register 16 indicates the class of the character coded into the second storage position of shift register 12. The third storage position in class shift register 16 carries a code indicating the class of the character which has just been processed by the system. The class shift register 16, therefore, contains at all times a sequence of these codes indicating the respective classes of three successive codes from the reader 11. The six leads which serve as the input to decoder 17 present to this decoder signals indicative of the class of the character coded into the second storage position of shift register 12 as well as the class of the characters immediately preceding and immediately following this character. The output of decoder 17 consists of four individual leads, only one of which may be actuated at any given time. The decoder unit 17 is arranged so that particular combinations of classes in the three storage positions of class register 16 result in the actuation of a particular output lead, the logical arrangement being such that the output lead is actuated in accordance with the proper form for the character which is coded into the second storage position of shift register 12.

The operation of the memory unit 14 is such that the eight-bit output signal generated by it is determined by the combination of the individual output lead from decoder 13 which is actuated and the individual output lead from decoder 17 which is actuated. This eight-bit code output from memory unit 14 presents to the typesetting control 19 a signal which is not only indicative of the character to be typeset, but also of the form for this character. Since the different forms may have different width values then the same information is presented to the justification unit 18 so that the justification may be computed taking into account the appropriate form of the character. Many automatic justification systems, such as that described in the above-mentioned United States patent are constructed to receive a six-bit input signal. In this instance the eight-bit codes would be translated into codes of no more than six bits. For example, each of the sixty-four most commonly used characters may be represented by a straight six-bit code and the remainder represented by a series of two successive codes with the initial signal acting in the justification operation in the same manner as an upper case indicator does when the justification system is operating on English composition.

The form of the signal provided from the typesetting control 19 to the typesetting apparatus will, of course, be dictated by the particular design of the linecasting or other typesetting machine. Thus if this machine is arranged to receive a series of instructions for each character then the typesetting control unit 19 will be arranged to convert the eight-bit signal into such a series.

The detailed operation of the memory unit 14 depends, of course, upon the logical basis for determination of the character form in Arabic script. Before describing the internal arrangement of the memory unit 14, this logic will first be discussed. As above mentioned, Arabic characters may be considered in three classes, those which appear only in the unconnected form, those which can appear in either the unconnected or the final form, and those which may appear in any of four forms. If the first group is designated as class 1, the second as class 2 and the third group as class 3, then the form of any individual character is determined by the following schedule.

| Principal Character | Preceding Character | Following Character | Form of Principal Character |
|---|---|---|---|
| Class 1 | | | Unconnected. |
| Class 2 | Class 1 | | Do. |
| Do | Class 2 | | Do. |
| Do | Class 3 | | Final. |
| Class 3 | Class 1 | Class 1 | Unconnected. |
| Do | do | Class 2 | Initial. |
| Do | do | Class 3 | Do. |
| Do | Class 2 | Class 1 | Unconnected. |
| Do | do | Class 2 | Initial. |
| Do | do | Class 3 | Do. |
| Do | Class 3 | Class 1 | Final. |
| Do | do | Class 2 | Medial. |
| Do | do | Class 3 | Do. |

Figure 2:
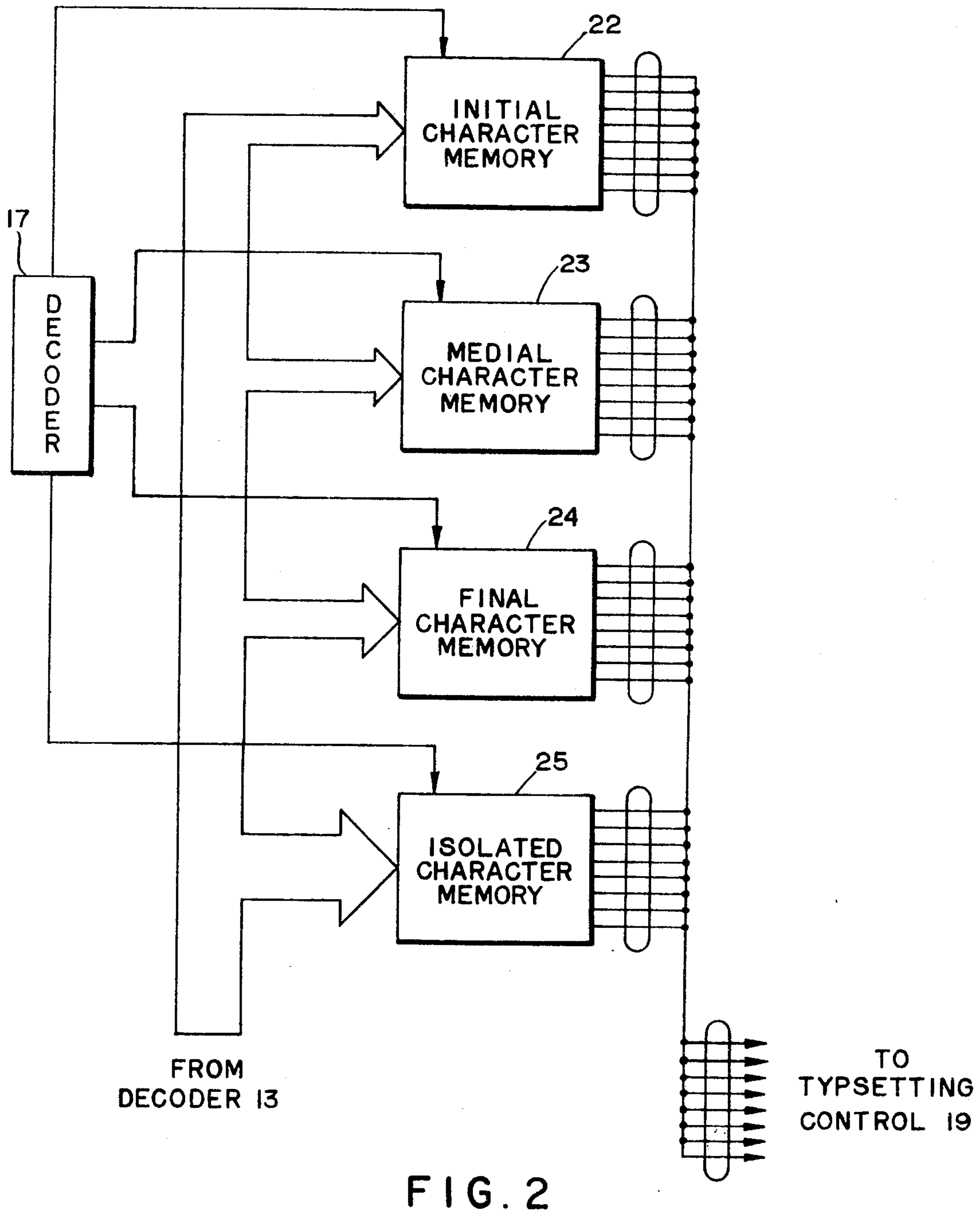
FIG. 2 is an illustration in block diagrammatic form of the internal logical arrangement of a memory unit suitable for use in the system illustrated in FIG. 1.

Turning now to FIG. 2, there is illustrated an internal arrangement of elements suitable for forming the memory unit 14 of this system. Included within the overall memory unit 14 are four individual memory units designated the initial character memory 22, the medial character memory 23, the final character memory 24 and the isolated character memory 25. Each of these individual memory sub-elements provides an eight-bit code onto eight output leads which constitute the output from the overall memory unit 14. Each of the four leads from the decoder unit 17 are connected to one of the individual memory sub-elements. The individual output leads from decoder 13 are each connected to one address point in the isolated character memory unit 25. Additionally twenty-nine of these output leads are also connected to individual address points within the final character memory unit 24, while twenty-two of the individual leads from decoder 13 are connected not only to the isolated character memory 25 and the final character memory 24, but also to individual address points in the medial character memory 23 and the initial character memory unit 22. The system can be constructed in a more general way, that is each of the sixty-four leads may be connected to an address point in each of the memory sub-elements. In the system described many of these leads would, however, be redundant. The individual memory units 22, 23, 24 and 25 are formed, typically, of magnetic core matrices arranged so that the eight-bit code stored at each individual address point will only be provided on the output leads from that one of the memory sub-elements which also is actuated by the lead from decoder unit 17. Since the logic of the decoder unit 17 is arranged in accordance with the above-described schedule, then the eight-bit code representing the appropriate character form for the principal character is generated, with the class information stored in shift register 16 providing the basis for this form determination.

The system above has been described for the typesetting of traditional Arabic. The same principles may be used for typesetting simplified Arabic in which all of the characters have only two forms. In this case the logic is of course simplified and the capacity requirement of the memory 14 may be reduced.

One further complication in Arabic lies in the use of the diacritical marks when typesetting classic works or children's volumes. These marks, along with all purely control codes, should be ignored in the logical operation of the class register 16. That is, if a class 3 character is preceded by a class 1 character and followed by a class 2 character, a diacritical mark following the class 3 character should not change the logic of form selection for the class 3 character. The diacritical mark may be keyboarded either before or after the consonant it modifies. In either case, the combination of the two successive codes may be recognized in the decoder 13. The storage capacity of the memory unit 14 may then be increased to provide a separate output code for each combination of a diacritical mark and consonant or the typesetting machine, if it has the capacity to do so, may be instructed to combine the letter and the diacritical mark. If the storage capacity of the memory unit 14 is increased, then the number of bits on the output signal must also be increased. The structure of each of the aforedescribed individual component elements is not considered to be novel or unique as is apparent from the previous description. Consequently, no additional structural description of these components is deemed necessary for one having skill in the art to practice the invention.

As previously mentioned the justification unit 18 may be any of several available types. Generally justification control units are either completely automatic or semi-automatic. Both types of units provide for automatic line termination if the line can be terminated at an interword position within the justification range of the space bands. Since each of the space bands in the composition has a minimum and maximum value, this provides some range for justification. However, there do occur lines which cannot be terminated within justification range at an interword point. When this is the case, the semi-automatic justification system provides for operator intervention to manually introduce a hyphen into the English composition. In the automatic justification system, the hyphenation is done automatically in accordance with a stored program or dictionary. In Arabic, hyphens are not used to justify, but rather a lengthening connecting stroke called a kashida is introduced between the particular characters wthin the words to lengthen the line. In general a kashida may be inserted between a character in its initial form and a character in medial form or between two characters in medial form or between a character in medial or initial form and final form. Most generally it can follow any character in initial or medial form. In order then for the justification operation to take place with an Arabic typesetting system as described, a system for introducing kashidas must be substituted for the hyphenation arrangement used in the English composition. One system for accomplishing this is to insert one provisional kashida in each word and then arrange the typesetting control unit 19 so that the number of provisional kashidas which are actually converted into transmitted kashidas is determined by the justification unit 18. Thus if the line cannot be terminated at an interword space, then the justification unit 18 can provide a signal to the typesetting control 19 indicating the number of kashidas required to accumulate the necessary width. By appropriate logic gating in the typesetting control 19, the provisional kashidas up to this number may be converted to transmitted kashidas to provide for the justification of the line.

Figures 3, 4:
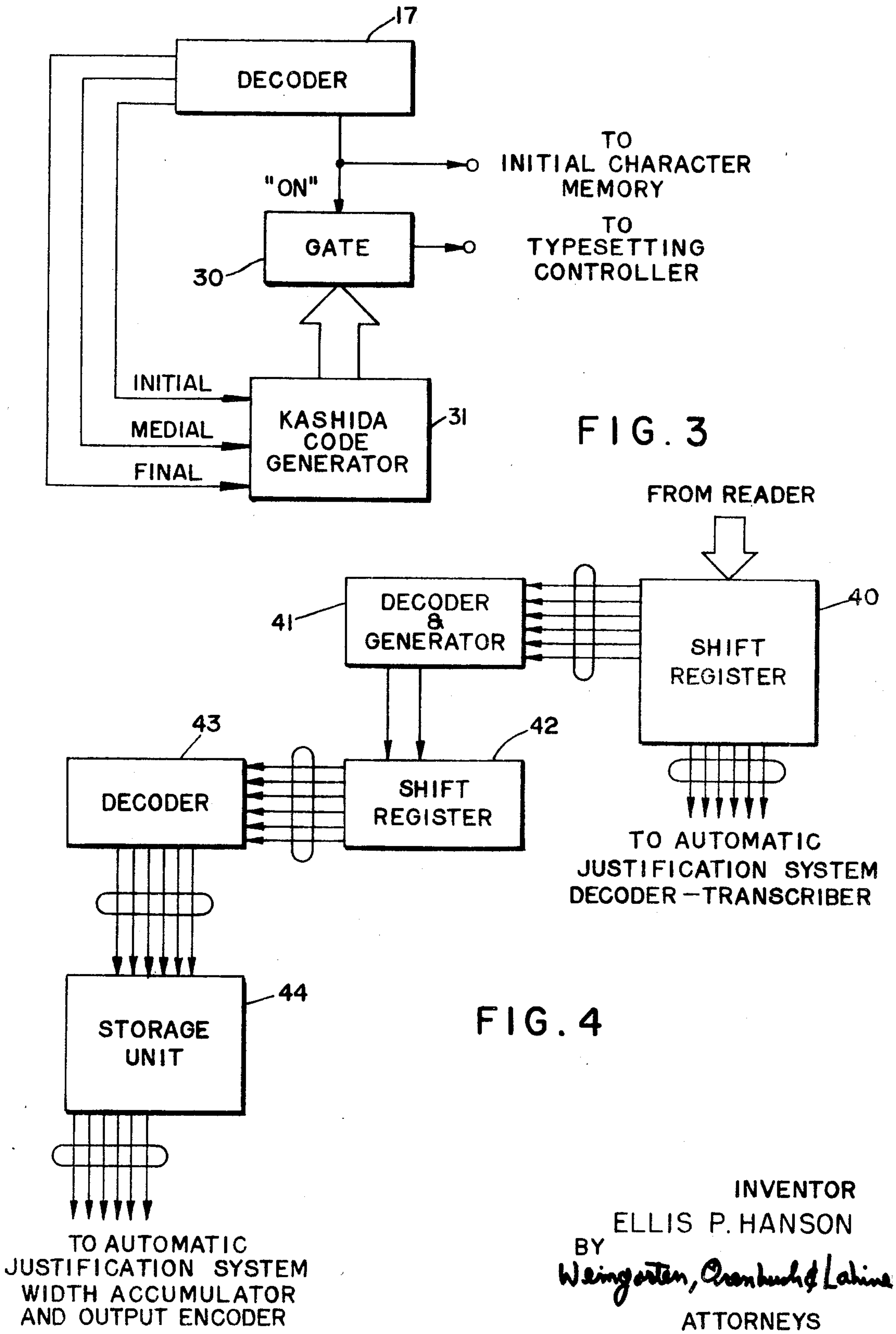
FIG. 3 is an illustration in block diagrammatic form of a group of interconnected elements particularly suitable for use with the control system of FIG. 1 in the justification of Arabic scripts.
FIG. 4 is an illustration in block diagrammatic form of a control system constructed in accordance with the principles of this invention for use in typesetting ligatures.

There is illustrated in FIG. 3 a block diagram of a suitable logic system for generating provisional kashidas. As previously described an output lead from decoder 17 is actuated whenever the character in the second position of shift register 12 should be in its initial form. This output lead can also be provided to a normally closed gate 30 as an "on" signal. A kashida code generator unit 31 which provides a multiple bit code indicating a kashida is connected through the gate 30 to the typeset controller unit 19. This multiple code merely indicates the presence of a kashida between a character in its initial form and a character in medial form, or between two characters in medial form, or between a character in medial or initial form and final form as described above. Therefore, the multiple bit code may be generated by kashida generator 31 in response to the respective output signals from decoder 17. The arrival of the "on" signal from the decoder 17 then serves to open the gate 30 for a short period of time sufficient to allow the code signal indicating a kashida to be entered into the typesetting control unit 19. With this arrangement a kashida code signal is provided to the typeset controller 19 after each initial character and hence one such signal is provided for each word. It is apparent that with a system of this general type either the typesetting control unit 19 or the actual linecasting or typesetting unit itself must have a sufficient delay in it to permit the storage of an entire line since the insertion of even a single kashida cannot be determined until the total width of the line of composition has been accumulated.

The system described above in connection with FIGS. 1, 2 and 3 is a typesetting process controller for use in setting scripts such as Arabic in which the form of the characters depends upon their position within the composition. Similar problems are introduced into the typesetting of many languages as a result of ligatures. In typesetting, a ligature is a particular character which is substituted for specific combinations of letters. Ligatures are particularly common in the Indian languages, but they also occur in English. The English ligatures involve the letters f, i and l. Thus different composite characters are substituted for the combinations fi, fl, ff, ffi and ffl. A system similar to that described above for typesetting the Arabic scripts may be used to provide for the typesetting of these ligatures without requiring the keyboard operator to keyboard the ligature forms into the composition. Typically such a system would be used with an automatic justification system such as that described in U.S. Pat. 3,307,154. In such a case the system would be inserted between the reader unit which responds to the input tape and a unit serving as a decoder and transcriber, such as that shown in FIG. 2 of that patent.

A system for providing this ligature typesetting feature is illustrated in FIG. 4. The output signals from a reader are provided to the input of a two-storage position shift register 40 with the output from the second storage position being applied to the decoder transcriber unit of the justification system. The first storage position of shift register 40 is connected to a decoder and translator unit 41 which provides a two-bit output code to a second shift register 42. The shift register 42 has three storage positions. The decoder and translator unit 41 provides on its two-bit output lead a signal indicating whether the character encoded in the first storage position of shaft register 40 is an f, an i, an l, or a character other than these three letters. Thus the shift register 42 contains in its second storage position a code indicating whether the output code from the second position of the basic shift register 40 is an f, l, i or whether it is some other character. The other two storage positions in this shift register 42 then indicate the same information about the characters immediately preceding and immediately following this principal character. The codes in each of the three storage positions of the shift register 42 are connected to a decoder unit 43 which has six individual output leads. Depending upon the particular combination of codes stored in shift register 42, one of the six individual output leads from decoder unit 43 will be actuated. Each of these output leads is connected to a particular address point in a storage unit 44 so that upon actuation of the appropriate lead a signal representing the correct ligature or a character may be applied both to the justification width accumulator and to the output encoder of the justification system as a substitute for the characters absorbed in the ligature.

From the foregoing description it is apparent that the structure of the components shown in FIG. 4 has the following correspondence with the components shown in FIG. 1. Shift register 40 is similar to shift register 12; decoder and generator 41 is analogous to decoder and translator 15; shift register 42 is like shift register 16; decoder 43 is similar to decoder 17 with six output leads instead of four; and storage unit 44 may also consist of core matrices as does memory unit 14.

The logic of the ligatures in English text is indicated by the following tabulation.

| Principal Character | Preceding Character | Following Character | Output Instruction |
|---|---|---|---|
| f | Other | i | fi composite form and delete the original codes for both f and i. |
| f | do | l | Composite ligature form for fl and delete the original code for both f and l. |
| f | f | Other | Insert the composite character for ff and delete an f code. |
| f | Other | do | No output. |
| f | do | f | Delete the f code. |
| f | f | i | Insert the composite character ffi and delete an f code and the following i code. |
| f | f | l | Insert the composite character code ffl and delete an f code and the following l code. |
| f | i | f | Delete an f code. |
| f | l | f | Delete an f code. |

There should be no output from this storage unit 44 when the principal character is anything other than f.

Having thus described the invention, what is claimed as new and desired to be secured by Letters Patent is:

1. Apparatus for generating typesetting control signals from character identification code input signals to produce composed script in a language having different character forms and wherein the appropriate form for a selected character is determined by the characters preceding and succeeding the selected character, comprising;

means for generating multiple bit electrical character identification signals in response to said character identification input signals, first means responsive to said electrical character identification signals for indicating individual characters represented by said character identification signals, second means responsive to said electrical character identification signals for indicating the form of the characters indicated by said first means in accordance with preceding and succeeding character indication, and means responsive to said first means and said second means for generating control signals representative of the indicated character form to form part of said typesetting control signals, said character forms are grouped in classes and said second means includes means for determining the class of successive electrical character identification signals and means responsive to said successive classes of electrical character identification signals to provide output signals each representing a particular character form, said means for determining classes in a decoder for generating signals representative of the class of successive electrical identification signals and includes means for storing a number of successive class signals, and said means for providing character form output signals is a second decoder responsive to both a class signal preceding and succeeding the class signal representative of a selected character to determine the character form of the selected character.

2. Apparatus as in claim 1 wherein said first means includes a multiple position storage means for storing successive electrical character identification signals and means for decoding said electrical character identification signals to provide an output signal representative of respective individual characters.

3. Apparatus as in claim 2 wherein said means for generating control signals includes a memory unit containing character forms of the individual characters in said language, said memory unit includes four independent memory sections, each of said memory sections containing information relating to a particular character form of said language, said control signals are generated in response to an addressed location within a memory unit determined by the individual characters indicated by said first means and said output signals, and said apparatus further comprises means for indicating lengthening strokes between selected characters in response to selected combinations of said output signals.

References Cited

UNITED STATES PATENTS

| | | | |
|---|---|---|---|
| 2,762,485 | 9/1956 | Bafour et al. | 197—84 X |
| 2,806,575 | 9/1957 | Higonnet et al. | 197—84 |
| 2,940,575 | 6/1960 | Khalil | 197—1 |
| 2,968,383 | 1/1961 | Higonnet et al. | 197—20 |
| 3,148,766 | 9/1964 | Higonnet et al. | 199—18 |
| 3,278,003 | 10/1966 | O'Brien et al. | 199—18 |
| 3,278,004 | 10/1966 | O'Brien et al. | 199—18 |
| 3,292,764 | 12/1966 | Midgette et al. | 197—20 X |
| 3,325,786 | 6/1967 | Shashoua et al. | 197—1 X |
| 3,332,617 | 7/1967 | Higonnet et al. | 197—84 X |

ERNEST T. WRIGHT, Jr., Primary Examiner

U.S. Cl. X.R.

197—1.1, 19, 84